US006824216B2

(12) United States Patent
Uramichi

(10) Patent No.: US 6,824,216 B2
(45) Date of Patent: Nov. 30, 2004

(54) SEAT RECLINING MECHANISMS

(75) Inventor: Hideki Uramichi, Toyota (JP)

(73) Assignee: Araco Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/385,201

(22) Filed: Mar. 10, 2003

(65) Prior Publication Data

US 2003/0178879 A1 Sep. 25, 2003

(30) Foreign Application Priority Data

Mar. 13, 2002 (JP) ........................................ 2002-069012

(51) Int. Cl.[7] .............................................. B60N 2/02
(52) U.S. Cl. ...................................................... 297/366
(58) Field of Search ................................. 297/366, 367; 29/428, 432, 432.1, 432.2, 893.3; 16/235, 239, 319, 354

(56) References Cited

U.S. PATENT DOCUMENTS

| 6,024,410 A | * | 2/2000 | Yoshida .................... 297/301.1 |
| 6,142,569 A | * | 11/2000 | Kidokoro et al. ........... 297/366 |
| 6,220,666 B1 | | 4/2001 | Ohya |
| 6,318,805 B1 | * | 11/2001 | Asano ........................ 297/367 |
| 2002/0000746 A1 | * | 1/2002 | Matsuura et al. ........... 297/366 |
| 2002/0043852 A1 | * | 4/2002 | Uramichi .................... 297/366 |

FOREIGN PATENT DOCUMENTS

JP      2000153327        6/2000

* cited by examiner

Primary Examiner—Milton Nelson, Jr.
(74) Attorney, Agent, or Firm—Patterson, Thuente, Skaar & Christensen, P.A.

(57) ABSTRACT

Seat reclining mechanisms for a vehicle seat may include a first housing (10) having a guide groove (20) that has first and second guide surfaces (24, 25), a second housing (12) having a toothed portion (13), and a pawl (16) slidably received in the guide groove. The pawl has first and second side surfaces (16b, 16c) that respectively correspond to the first and second guide surfaces of the guide groove. The pawl engages the toothed portion (13) of the second housing by sliding from its non-engaging position (C) to its engaging position (A) along the guide groove, thereby preventing the second housing from rotating relative to the first housing. The first side surface of the pawl and the first guide surface of the guide groove are arranged and constructed such that a clearance defined therebetween is changed so as to have an optimal width (S) when the pawl (16) is shifted from the non-engaging position (C) to the engaging position (A).

9 Claims, 5 Drawing Sheets

SEAT RECLINING MECHANISMS

This application claims priority to Japanese Patent Application Serial Number 2002-69012, the contents of which are incorporated herein by reference.

BACKGROUND OF THE INVENTION

1. Field of the Invention

The present invention relates to seat reclining mechanisms for adjusting a tilt angle of a seat back of a vehicle seat. More particularly, the present invention relates to seat reclining mechanisms that are disposed on one side of the vehicle seat

2. Description of the Related Art

Typically, a known seat reclining mechanism for adjusting a tilt angle of a seat back of a vehicle seat includes a pair of opposing disk-like housings, i.e., a first housing and a second housing. The first housing is affixed to a cushion frame that supports a vehicle seat cushion. The second housing is affixed to a seat back frame that supports the vehicle seat back. The first and second housings are circumferentially connected by a fastener or clip ring so that the second housing can move or rotate relative to the first housing around a rotational axis. Further, the rotational axis corresponds to a common centerline of the first and second housings.

The seat reclining mechanism also includes a rotational rod or shaft that extends along the rotational axis through the cushion frame and the seat back frame, as well as through the first and second housings. The rotational shaft includes an extended portion (manipulating portion), which portion is typically connected to a seat operation handle or lever.

The seat reclining mechanism further includes a locking means that can prevent the second housing from rotating relative to the first housing, thereby locking the seat reclining mechanism. The locking means essentially consists of a hinge cam, a slide member and a pair of pawls that are received within the housings. The hinge cam is secured to or integrally formed with the rotational shaft, so as to rotate with the rotational shaft. The slide member is laterally movably or slidably attached to the first housing. The slide member includes a specially shaped central bore that receives the hinge cam. The central bore partially engages the hinge cam, so that the slide member can laterally slide or move when the rotational shaft rotates. As will be recognized, the slide member is configured in order to reliably prevent the slide member from rotating relative to the first housing.

In addition, the first housing is formed with a pair of vertical guide grooves, which grooves are positioned on respective sides of the slide member. The pawls are vertically movably or slidably received within the guide grooves of the first housing. The pair of pawls are configured to engage the slide member. Thus, the pawls can vertically slide or shift when the slide member laterally slides. As will be recognized, because the pawls are received in the guide grooves of the first housing, the pawls are prevented from rotating relative to the first housing.

Further, the second housing has an inner circular surface. A pair of concave toothed portions circumferentially extend over two separate portions of the inner circular surface. Each of the pawls has a curved outer surface. A corresponding convex toothed portion is provided on each pawl for releasably engaging the respective concave toothed portions of the second housing.

In addition, a biasing (spiral) spring is disposed within the first housing. The spiral spring urges (biases) the rotational shaft in a counterclockwise direction. As a result, the rotational shaft is normally retained in a locked position. When the rotational shaft is retained in the locked position, the slide member is positioned at the leftmost position. When the slide member is retained in this position, the slide member pushes or urges the respective pawls in opposite outward directions so that the respective convex toothed portions of the pawls engage the concave toothed portions of the second housing. In this state, the second housing is prevented from rotating relative to the first housing, thereby locking the seat reclining mechanism. As a result, the seat back frame is locked in position relative to the cushion frame and thus, the seat back is locked relative to the seat cushion.

As described above, because the pawls are received in the guide grooves of the first housing, the pawls are prevented from rotating relative to the first housing. Therefore, when the respective convex toothed portions of the pawls engage the concave toothed portions of the second housing, the second housing is prevented from rotating relative to the first housing, thereby locking the seat reclining mechanism. However, considerable clearances are defined between the pawls and the guide grooves such that the pawls are easily assembled to the first housing. Such clearances allow the pawls to idly laterally move within the guide grooves. As a result, the second housing can be rotated relative to the first housing by a small degree when the seat reclining mechanism is locked. Such rotation of the second housing relative to the first housing may cause backlash between the cushion frame and the seat back frame when the seat reclining mechanism is locked.

A method for eliminating such backlash is taught, for example, by U.S. Pat. No. 6,220,666, in which after the pawls are received within the guide grooves, the first housing is partly deformed at portions adjacent to the guide grooves by a punch press, thereby forming projections that project into the guide grooves by a desired projecting distance. The projections thus formed may slidably contact the pawls, so that the pawls can be prevented from laterally moving within the guide grooves. Thus, the second housing is prevented from rotating relative to the first housing when the seat reclining mechanism is locked. As a result, the backlash between the cushion frame and the seat back frame can be eliminated when the seat reclining mechanism is locked.

However, it is very difficult to precisely control deformation of the first housing (projecting distances of the projections) by the punch press. That is, the first housing can be excessively deformed. Therefore, it is possible that the pawls cannot move or slide within the guide grooves.

SUMMARY OF THE INVENTION

It is, accordingly, one object of the present teachings to provide improved seat reclining mechanisms.

For example, in-one aspect of the present teachings, a seat reclining mechanism for a vehicle seat may include a first housing having a guide groove, a second housing having a toothed portion, and a pawl slidably received in the guide groove. The guide groove has first and second guide surfaces. The pawl has first and second side surfaces that respectively correspond to the first and second guide surfaces of the guide groove. The pawl engages the toothed portion of the second housing by sliding from its non-engaging position to its engaging position along the guide groove, thereby preventing the second housing from rotating relative to the first housing. The first side surface of the pawl and the first guide surface of the guide groove are arranged and constructed such that a clearance defined therebetween is changed so as to have an optimal width when the pawl is shifted from the non-engaging position to the engaging position.

Thus, when the pawl is shifted from the non-engaging position to the engaging position, the clearance defined between the first side surface of the pawl and the first guide surface of the guide groove is effectively changed so as to have the optimal width. Therefore, the pawl is prevented from laterally moving within the guide groove when the pawl is positioned in the engaging position (i.e., when the seat reclining mechanism is locked). Thus, the second housing is effectively prevented from rotating relative to the first housing when the pawl is positioned in the engaging position. As a result, backlash between a cushion frame and a seat back frame that are linked by the seat reclining mechanism can be effectively eliminated or minimized when the seat reclining mechanism is locked.

Other objects, features and advantages of the present invention will be readily understood after reading the following detailed description together with the accompanying drawings and the claims.

DETAILED DESCRIPTION OF THE INVENTION

Figure 1:
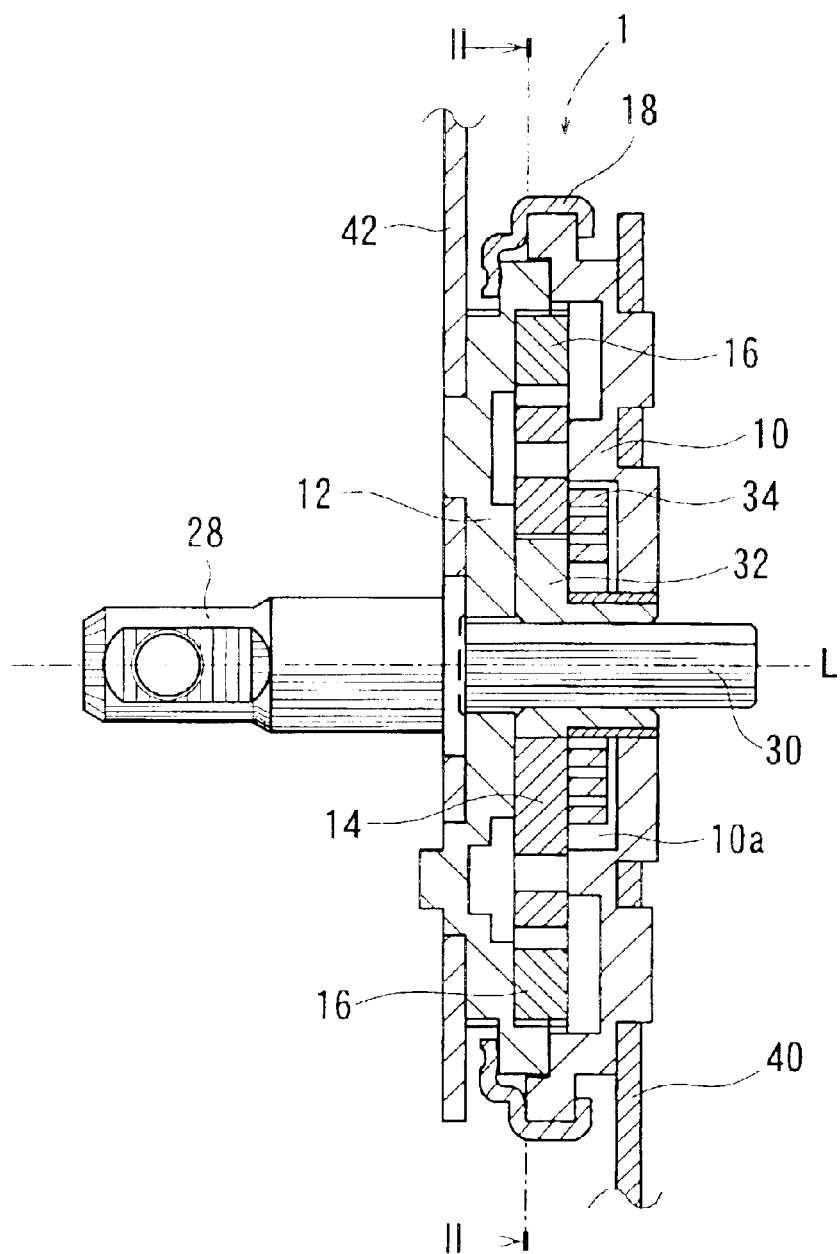
FIG. 1 is a vertical, cross-sectional view of a seat reclining mechanism according to a first embodiment of the present teachings.

In one embodiment of the present teachings, a seat reclining mechanism for a vehicle seat may include a first housing having a guide groove, a second housing having a toothed portion, and a pawl slidably received in the guide groove. The guide groove may have first and second guide surfaces. The pawl may have first and second side surfaces that respectively correspond to the first and second guide surfaces of the guide groove. The pawl may engage the toothed portion of the second housing by sliding the pawl from its non-engaging position to its engaging position along the guide groove, thereby preventing the second housing from rotating relative to the first housing. The first side surface of the pawl may have an outwardly inclined portion that is inclined to the first guide surface of the guide groove. In addition, the first guide surface may be provided with a projection. In this embodiment, a clearance defined between the first side surface of the pawl and the first guide surface of the guide groove can be changed or narrowed so as to have an optimal width when the pawl is shifted from the non-engaging position to the engaging position.

In another embodiment of the present teachings, the first side surface of the pawl may have an inwardly inclined portion that is inclined to the first guide surface of the guide groove. In addition, the first guide surface may be provided with a projection. In this embodiment, the clearance defined between the first side surface of the pawl and the first guide surface of the guide groove can be changed or widened so as to have an optimal width when the pawl is shifted from the non-engaging position to the engaging position.

In these embodiments, the projection may have an inclined surface that is parallel to the inclined portion of the pawl. Optionally, the projection may preferably be formed by partly deforming the first housing. Preferably, the pawl is shifted to a position outside a sliding range of the pawl within the guide groove. Thereafter, the first housing is deformed until the formed projection substantially contacts the inclined portion thereby forming the projection.

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

First Detailed Representative Embodiment

A first detailed representative embodiment of the present teachings is shown in FIGS. 1 to 5 and the first detailed representative embodiment is related to the above-described known seat reclining mechanism.

Figure 2:
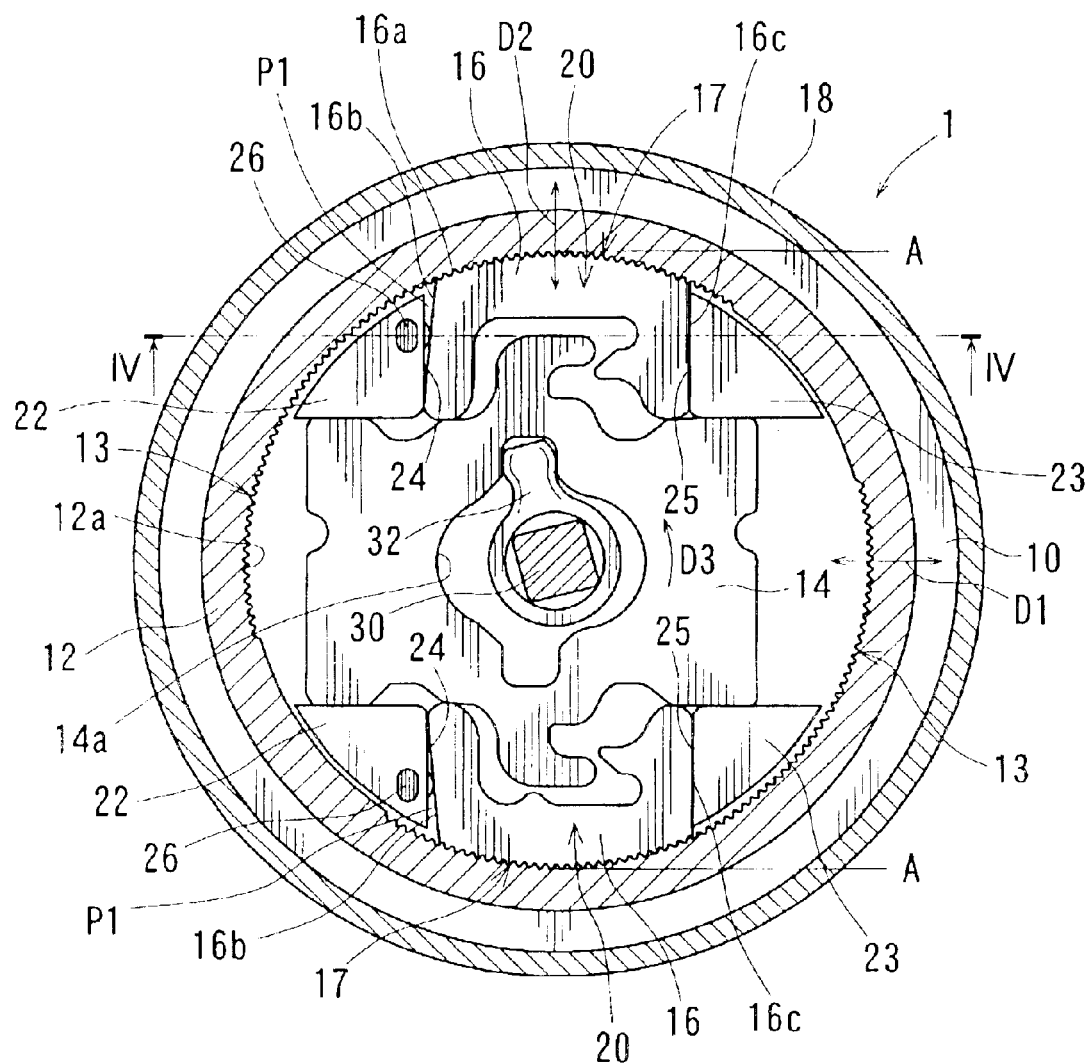
FIG. 2 is a cross-sectional view taken along line II—II in FIG. 1, which view illustrates a locked position of a rotational shaft of the seat reclining mechanism.
Figure 3:
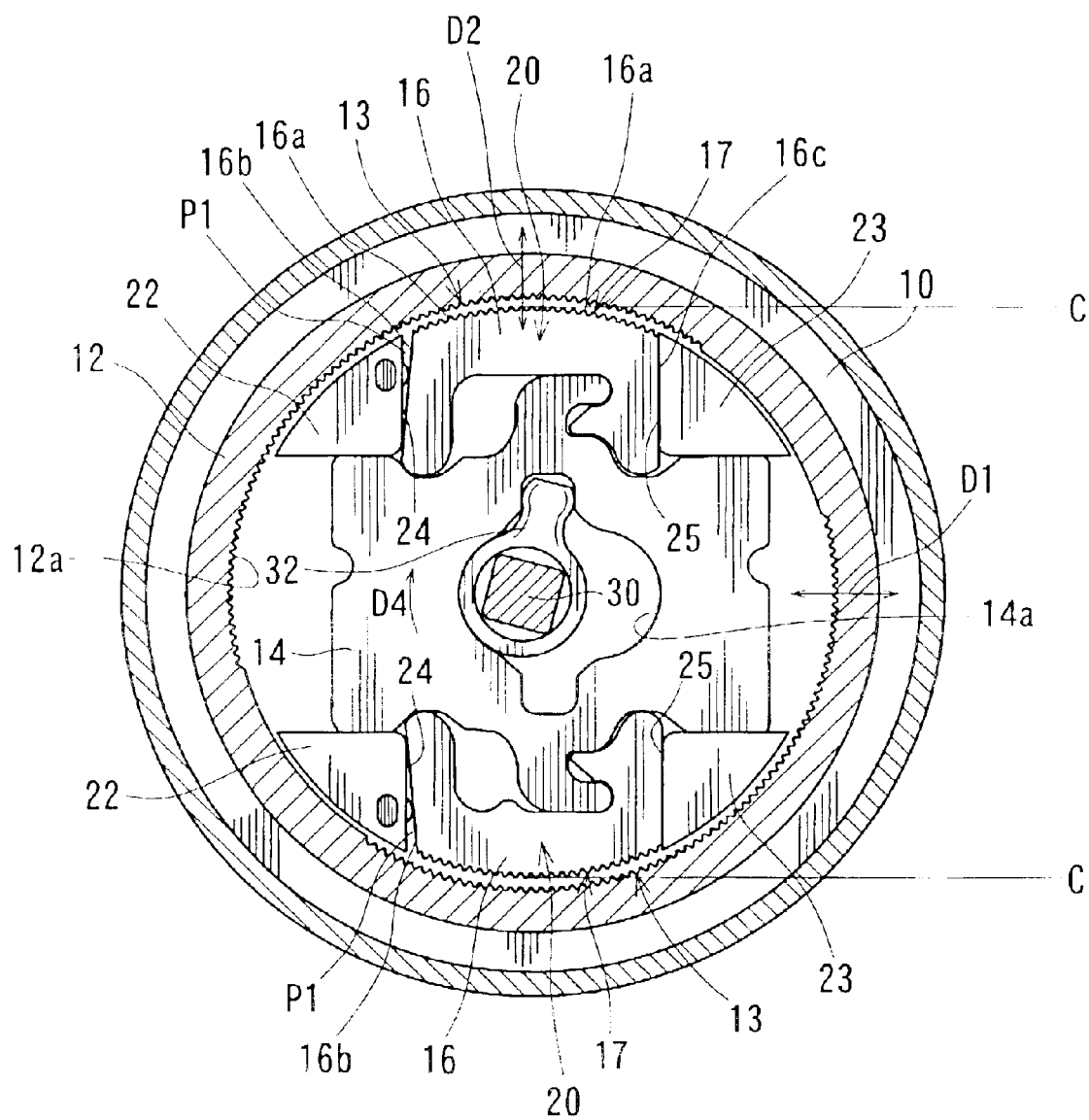
FIG. 3 is a cross-sectional view taken along line II—II shown in FIG. 1, which view illustrates an unlocked position of the rotational shaft.

As shown in FIGS. 1 to 3, a representative seat reclining mechanism 1 for adjusting and locking a tilt angle of a seat back of a vehicle seat (not shown) is designed to. be disposed on one side of the vehicle seat. The seat reclining mechanism 1 includes a pair of opposing disk-like housings, i.e., a first housing 10 and a second housing 12. The first housing 10 is affixed to a cushion frame 40 that supports a vehicle seat cushion (not shown). The second housing 12 is affixed to a seat back frame 42 that supports the vehicle seat back. The first and second housings 10 and 12 are circumferentially connected by a fastener or clip ring 18 so that the second housing 12 can move or rotate relative to the first housing 10 around a rotational axis L. Further, the rotational axis L corresponds to a common centerline of the first and second housings 10 and 12.

The seat reclining mechanism 1 also includes a rotational rod or shaft 30 that extends along the rotational axis L through the cushion frame 40 and the seat back frame 42, as well as through the first and second housings 10 and 12. The rotational shaft 30 includes an extended portion (manipulating portion) 28, which portion is typically connected to a seat operation handle or lever (not shown).

The seat reclining mechanism 1 further includes a locking means that can prevent the second housing 12 from rotating relative to the first housing 10, and thereby lock the seat reclining mechanism 1. The locking means essentially consists of a hinge cam 32, a slide member 14 and a pair of pawls 16 that are received within the housings 10 and 12. The hinge cam 32 is secured to or integrally formed with the rotational shaft 30, so as to rotate with the rotational shaft 30. The slide member 14 is laterally movably or slidably attached to the first housing 10. The slide member 14 includes a specially shaped central bore 14a that receives the hinge cam 32. The central bore 14a partially engages the hinge cam 32, so that the slide member 14 can laterally slide or move in the direction shown by arrow D1 when the rotational shaft 30 rotates. As will be recognized, the slide member 14 is configured in order to reliably prevent the slide member 14 from rotating relative to the first housing 10.

In addition, as shown in FIGS. 2 and 3, the first housing 10 is formed with two pairs of opposite thickened portions 22 and 23, so that a pair of vertical guide grooves 20 are defined therebetween. Each of the guide grooves 20 has a pair of opposite left and right (first and second) guide surfaces 24 and 25 that are defined by vertical side end surfaces of the opposite thickened portions 22 and 23. As will be appreciated, the thickened portions 22 and 23 are preferably arranged such that the guide grooves 20 are positioned on respective sides of the slide member. Also, the side end surfaces of the thickened portions 22 and 23 are preferably shaped such that the guide surfaces 24 and 25 are parallel to each other and are perpendicular to the direction D1. The pawls 16 are vertically movably or slidably received within the guide grooves 20 of the first housing 10. The pair of pawls 16 are configured to engage the slide member 14. Thus, the pawls 16 can vertically slide or shift in the direction shown by arrow D2 when the slide member 14 laterally slides. As will be recognized, because the pawls 16 are received in the guide grooves 20, the pawls 16 may be prevented from rotating relative to the first housing 10.

Further, as shown in FIGS. 2 and 3, the second housing 12 has an inner circular surface 12a. A pair of concave toothed portions 13 circumferentially extend over two separate portions of the inner circular surface 12a. Each of the pawls 16 has a curved outer surface 16a and opposite left and right (first and second) side surfaces 16b and 16c. A corresponding convex toothed portion 17 is provided on the curved outer surface 16a of each pawl 16 for releasably engaging the respective concave toothed portions 13.

In addition, the first housing 10 is formed with a depressed portion 10a adjacent to the rotational shaft 30, and a biasing (spiral) spring 34 is disposed within the depressed portion 10a. The spiral spring 34 urges (biases) the rotational shaft 30 in the direction shown by arrow D3 (counterclockwise). As a result, the rotational shaft 30 is normally retained in a locked position (FIG. 2). When the rotational shaft 30 is retained in the locked position, the slide member 14 is positioned in the leftmost position. When the slide member 14 is retained in this position, the slide member 14 pushes or urges the respective pawls 16 in opposite outward directions so that the respective convex toothed portions 17 engage the concave toothed portions 13 of the second housing 12. That is, when the slide member 14 is positioned in the leftmost position, the pawls 16 are positioned in engaging positions A. In this state, the second housing 12 is prevented from rotating relative to the first housing 10, thereby locking the seat reclining mechanism 1. As a result, the seat back frame 42 is locked in position relative to the cushion frame 40 and thus, the seat back is locked relative to the seat cushion.

When the rotational shaft 30 is rotated in the direction shown by arrow D4 (clockwise) against the urging force of the spiral spring 34, the rotational shaft 30 rotates toward an unlocked position, which position corresponds to the position shown in FIG. 3. When the rotational shaft 30 is rotated to the unlocked position, the slide member 14 is positioned in the rightmost position. When the slide member 14 is retained in this position, the slide member 14 moves or pushes the respective pawls 16 in the inward direction, so that the convex tooth portions 17 are disengaged from the concave toothed portions 13. That is, when the slide member 14 is positioned in the rightmost position, the pawls 16 are positioned in non-engaging positions C. In this state, the second housing 12 can freely rotate relative to the first housing 10, thereby unlocking the seat reclining mechanism 1. As a result, the seat back frame 42 can freely rotate or pivot relative to the cushion frame 40, such that the seat back can be tilted relative to the seat cushion.

As described above, because the pawls 16 are received in the guide grooves 20 of the first housing 10, the pawls 16 may be prevented from rotating or moving relative to the first housing 10. Therefore, when the respective convex toothed portions 17 of the pawls 16 engage the concave toothed portions 13 of the second housing 12, the second housing 12 is prevented from rotating relative to the first housing 10, thereby locking the seat reclining mechanism 1. However, if considerable or excessive clearances exist between the pawls 16 and the guide grooves 20, the pawls 16 may idly laterally move within the guide grooves 20 when the respective convex toothed portions 17 of the pawls 16 engage the concave toothed portions 13 of the second housing 12. As a result, the second housing 12 can be rotated relative to the first housing 10 by a small degree when the seat reclining mechanism 1 is locked. Such rotation of the second housing 12 relative to the first housing 10 may cause backlash between the cushion frame and the seat back frame.

Figure 5:
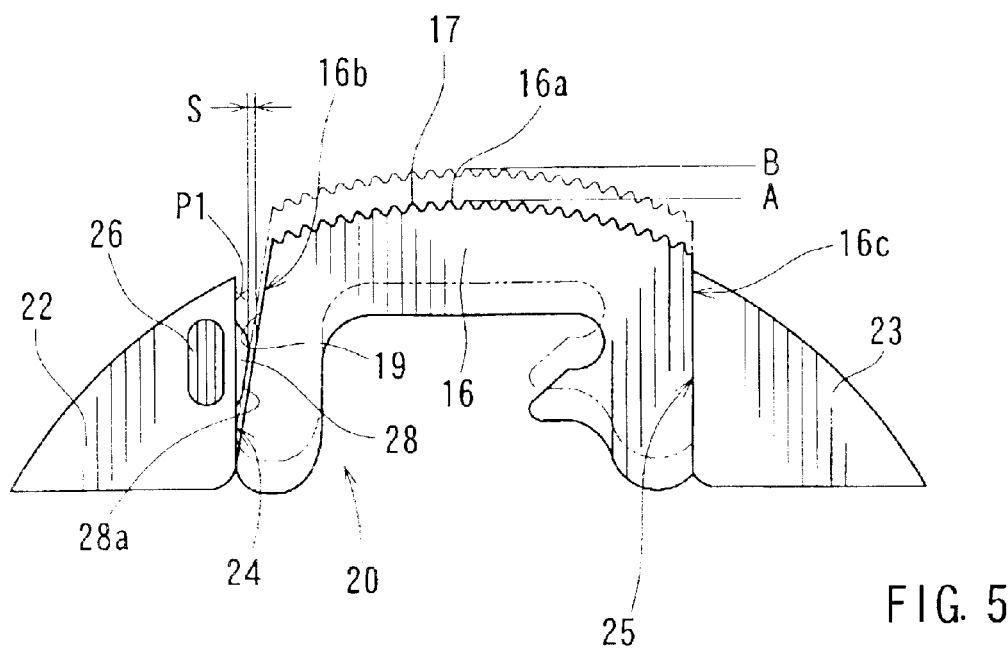
FIG. 5 is an enlarged perspective view of a guide groove and a pawl.

As best shown in FIG. 5, in the first representative embodiment, in order to minimize or optimize such clearances formed between the pawls 16 and the guide grooves 20 when the seat reclining mechanism 1 is locked, the left side surfaces 16b of the pawls 16 that face the guide surfaces 24 of the guide grooves 20 are formed with inclined portions 19. The inclined portions 19 are inclined outwardly at a desired angle to the guide surfaces 24. That is, the inclined portions 19 are inclined to the guide surfaces 24 such that outwardly spread wedge shaped clearances P1 are defined therebetween.

Figure 4:
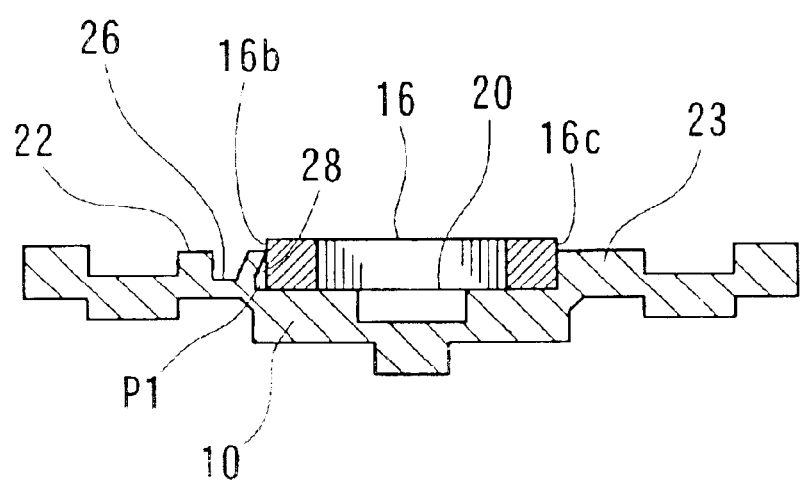
FIG. 4 is a cross-sectional view taken along line IV—IV in FIG. 2.

On the other hand, as shown in FIGS. 4 and 5, the thickened portions 22 corresponding to the guide surfaces 24 are formed with projections 28 that project into the clearances P1 by a desired distance. Preferably, the projections 28 may have inclined end surfaces 28a that are parallel to the inclined portions 19 of the pawl left side surfaces 16b. As best shown in FIG. 4, such projections 28 are preferably formed by deforming depressed portions 26 that are previously formed in the thickened portions 22 along the side peripheries thereof. That is, the projections 28 are formed by bending or deforming the side peripheries of the thickened portions 22 toward the clearances P1 by means of a special tool (not shown). As will be appreciated, the depressed portions 26 are preferably formed when the first housing 10 is manufactured, for example, by cold forging.

Processes for forming the projections 28 will now be described in detail with reference to FIG. 5. First, each of the pawls 16 is received in the guide groove 20 of the first housing 10. Thereafter, the pawl 16 is moved outwardly along the guide groove 20 while the right side surface 16c of the pawl 16 contacts the guide surface 25 of the guide groove 20, thereby positioning the pawl 16 at a position B, as shown by a broken line. This position is a position that is shifted or projected above the engaging position A of the pawl 16, i.e., a position outside a sliding range of the pawl 16. As will be easily understood, the sliding range of the pawl 16 means a range defined between the engaging and non-engaging positions A and C of the pawl 16. Subsequently, as described above, the projection 28 is formed by deforming depressed portions 26, while the pawl 16 is positioned at the position B. The depressed portion 26 is deformed until the end surface 28a of the formed projection 28 contacts the inclined portions 19 of the pawl left side surface 16b. Thus, the projection 28 that projects by a desired distance is preferably formed.

According to the projection 28 thus formed, when the pawl 16 is inwardly moved from the position B toward a position inside the sliding range of the pawl 16, the inclined portions 19 of the pawl left side surface 16b is gradually separated from the end surface 28a of the projection 28, thereby defining a clearance therebetween. In this embodiment, when the pawl 16 is positioned in the engaging position A, the clearance may have an optimal width S. Further, when the pawl 16 is in the non-engaging position C (FIG. 3), the clearance may have a width slightly wider than the width S.

Operation of the locking mechanism 1 described according to this embodiment will now be described with reference to FIGS. 2 to 5.

As previously described, when the rotational shaft 30 is positioned in the locked position by means of the biasing spring 34, the slide member 14 is positioned at the leftmost position. When the slide member 14 is retained in this position, the respective pawls 16 are pushed or urged to their engaging positions A by means of the slide member 14, so that the respective convex toothed portions 17 of the pawls 16 engage the concave toothed portions 13 of the second housing 12. In this state, the second housing 12 is prevented from rotating relative to the first housing 10, thereby locking the seat reclining mechanism 1. As a result, the seat back frame 42 is locked in position relative to the cushion frame 40 and thus, the seat back is locked relative to the seat cushion.

The inclined portions 19 of the pawl side surfaces 16b and the projections 28 are appropriately arranged and constructed as described above. Therefore, when the pawl 16 is shifted from the non-engaging position C to the engaging position A, the clearances between the projection end surfaces 28a and the inclined portions 19 of the pawl left side surfaces 16b are changed or decreased, so as to have the appropriate or optimal width S. Thus, when the respective pawls 16 are positioned in their engaging positions A (i.e., when the seat reclining mechanism 1 is locked), the pawls 16 may reliably prevented from laterally moving within the guide grooves 20. As a result, the second housing 12 cannot be substantially rotated relative to the first housing 10 when the seat reclining mechanism 1 is locked. Thus, the backlash between the cushion frame and the seat back frame is effectively eliminated when the seat reclining mechanism 1 is locked.

Further, the angle of the inclined portions 19 to the guide surfaces 24 can be appropriately determined. In addition, the number and shape of the projections 28 can be appropriately changed, as desired. Moreover, the inclined portions 19 and the projections 28 can be formed on the thickened portions 22 and the pawl 16, respectively.

Second Detailed Representative Embodiment

Figure 6:
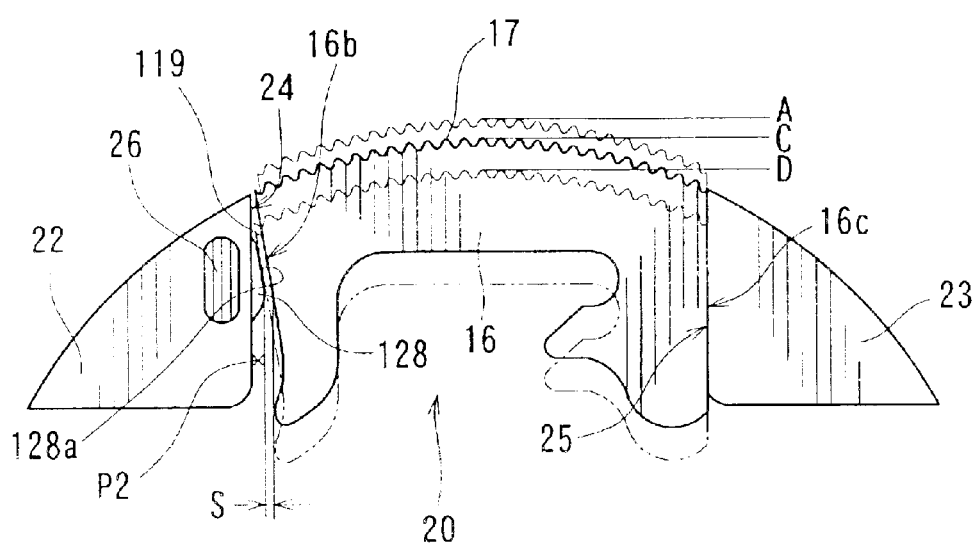
FIG. 6 is an enlarged perspective view of a guide groove and a pawl of a seat reclining mechanism according to a second embodiment of the present teachings.

The second detailed representative embodiment will now be described with reference to FIG. 6. Because the second embodiment relates to the first embodiment, only constructions and elements that are different from the first embodiment will be explained in detail. Elements that are the same in the first and second embodiments will be identified by the same reference numerals and detailed description of such elements will be omitted.

In this embodiment, the left side surfaces 16b of the pawls 16 that face the guide surfaces 24 of the guide grooves 20 are formed with inclined portions 119. The inclined portions 119 are inclined inwardly at a desired angle to the guide surfaces 24. That is, the inclined portions 119 are inclined to the guide surfaces 24 such that inwardly spread wedge shaped clearances P2 are defined therebetween.

On the other hand, the thickened portions 22 corresponding to the guide surfaces 24 are formed with projections 128 that project into the clearances P2 by a desired distance. Preferably, the projections 128 may have inclined end surfaces 128a that are parallel to the inwardly inclined portions 119 of the pawl left side surfaces 16b. Such projections 128 are formed in the same manner as the projections 28 of the first embodiment.

Processes for forming the projections 128 will now be described in detail with reference to FIG. 6. First, each of the pawls 16 is received in the guide groove 20 of the first housing 10. Thereafter, the pawl 16 is inwardly moved along the guide groove 20 while the right side surface 16c of the pawl 16 contacts the guide surface 25 of the guide groove 20, thereby positioning the pawl 16 at a position D, as shown by a broken line. This position is a position that is shifted or retracted below the non-engaging position C of the pawl 16, i.e., a position outside the sliding range of the pawl 16. Subsequently, the projection 128 is formed by deforming depressed portions 26, while the pawl 16 is positioned at the position D. The depressed portion 26 is deformed until the end surface 128a of the projection 128 contacts the inclined portions 119 of the pawl left side surface 16b. Thus, the projection 128 that projects by a desired distance is preferably formed. As will be appreciated, the end surface 128a of the projection 128 is inclined in the opposite direction to the end surface 28a of the projection 28 of the first embodiment.

According to the projection 128 thus formed, when the pawl 16 is outwardly moved from the position D toward a position inside the sliding range of the pawl 16, the inclined portions 119 of the pawl left side surface 16b is gradually separated from the end surface 128a of the projection 128, thereby defining a clearance therebetween. In this embodiment, when the pawl 16 is positioned in the engaging position A, the clearance may have an optimal width S. As will be appreciated, unlike the first embodiment, when the pawl 16 is positioned in the non-engaging position C, the clearance may have a width slightly narrower than the width S.

Operation of the locking mechanism 1 described according to this embodiment will now be described with reference to FIGS. 2, 3 and 6.

The inclined portions 119 of the pawl side surfaces 16b and the projections 128 are appropriately arranged and constructed as described above. Therefore, when the pawl 16 is shifted from the non-engaging position C to the engaging position A, the clearances between the projection end surfaces 128a and the inwardly inclined portions 119 of the pawl left side surfaces 16b are changed or decreased, so as to have the appropriate or optimal width S. Thus, when the respective pawls 16 are positioned in their engaging positions A (i.e., when the seat reclining mechanism 1 is locked), the pawls 16 may reliably be prevented from laterally moving within the guide grooves 20. As a result, the second housing 12 cannot be substantially rotated relative to the first housing 10 when the seat reclining mechanism 1 is locked. Thus, the backlash between the cushion frame and the seat back frame is effectively eliminated when the seat reclining mechanism 1 is locked.

Additional examples of relevant seat reclining mechanisms are found in U.S. Pat. Ser. No. 10/165,077, the contents of which are hereby incorporated by reference.

What is claimed is:

1. A seat reclining mechanism for a vehicle seat, comprising:
   a first housing having a guide groove, the guide groove having first and second guide surfaces;
   a second housing having a toothed portion;
   and a pawl slidably received in the guide groove, the awl having first and second side surfaces that respectively correspond to the first and second guide surfaces of the guide groove, wherein the pawl engages the toothed portion of the second housing by sliding from its non-engaging position to its engaging position along the guide groove, thereby preventing the second housing from rotating relative to the first housing, wherein the first side surface of the pawl and the first guide surface of the guide groove are arranged and constructed such that a clearance defined therebetween is changed so as to have an optimal width when the pawl is shifted from the non-engaging position to the engaging position.

2. A seat reclining mechanism as defined in claim 1, wherein the first side surface of the pawl has an inclined portion that is inclined to the first guide surface of the guide groove and the first guides surface is provided with a projection, and wherein the inclined portion and the projection are arranged and constructed such that the clearance is changed when the pawl is shifted from the non-engaging position to the engaging position.

3. A seat reclining mechanism as defined in claim 2, wherein the inclined portion comprises an outwardly inclined portion, and wherein the clearance is narrowed when the pawl is shifted from the non-engaging position to the engaging position.

4. A seat reclining mechanism as defined in claim 2, wherein the inclined portion comprises an inwardly inclined portion, and wherein the clearance is widened when the pawl is shifted from the non-engaging position to the engaging position.

5. A seat reclining mechanism as defined in any of claims 2, 3, and 4 wherein the projection has an inclined surface that is substantially parallel to the inclined portion of the pawl.

6. A seat reclining mechanism as defined in any of claims 2, 3, and 4, wherein the projection is formed by partly deforming the first housing.

7. A method for setting the clearance in the seat reclining mechanism as defined in claim 1, comprising: forming an inclined portion on the first side surface of the pawl;
   disposing the pawl within the guide groove of the first housing and sliding the pawl to a position outside a sliding range of the pawl;
   forming a projection on the first guide surface by partly deforming the first housing until the formed projection substantially contacts the inclined portion;
   sliding the pawl to a position inside the sliding range of the pawl, thereby defining the clearance between the inclined portion and the projection; and
   attaching the second housing to the first housing.

8. A method as defined in claim 7, wherein the inclined portion comprises an outwardly inclined portion, and wherein the position outside the sliding range comprises a position projected above the engaging position of the pawl.

9. A method as defined in claim 7, wherein the inclined portion comprises an inwardly inclined portion, and wherein the position outside the sliding range comprises a position retracted below the non-engaging position of the pawl.

* * * * *